United States Patent
Sinn et al.

(10) Patent No.: US 10,963,141 B2
(45) Date of Patent: Mar. 30, 2021

(54) SMART MULTI-TOUCH LAYOUT CONTROL FOR MOBILE DEVICES

(71) Applicant: Adobe Inc., San Jose, CA (US)

(72) Inventors: Richard Sinn, Milpitas, CA (US); Allan Young, Santa Rosa, CA (US)

(73) Assignee: ADOBE INC., San Jose, CA (US)

( * ) Notice: Subject to any disclaimer, the term of this patent is extended or adjusted under 35 U.S.C. 154(b) by 132 days.

(21) Appl. No.: 15/375,823

(22) Filed: Dec. 12, 2016

(65) Prior Publication Data
US 2018/0164988 A1   Jun. 14, 2018

(51) Int. Cl.
*G06F 3/048* (2013.01)
*G06F 3/0484* (2013.01)
*G06F 3/0488* (2013.01)

(52) U.S. Cl.
CPC ...... *G06F 3/04845* (2013.01); *G06F 3/04883* (2013.01)

(58) Field of Classification Search
CPC .... G06F 3/04842; G06F 3/04845; G06F 3/48; G06F 3/0488; G06F 3/048; G06F 3/0481; G06F 3/04883; G06F 3/04886
See application file for complete search history.

(56) References Cited

U.S. PATENT DOCUMENTS

| | | | | |
|---|---|---|---|---|
| 9,244,590 B1* | 1/2016 | Browder | ............. | G06F 3/04815 |
| 2011/0157025 A1* | 6/2011 | Hoover | ............... | G06F 3/04883 |
| | | | | 345/173 |
| 2011/0181528 A1* | 7/2011 | Capela | ................ | G06F 3/04845 |
| | | | | 345/173 |
| 2011/0304584 A1* | 12/2011 | Hwang | ............... | G06F 3/04845 |
| | | | | 345/174 |
| 2013/0346924 A1* | 12/2013 | Morrill | ............... | G06F 3/04845 |
| | | | | 715/863 |
| 2014/0059485 A1* | 2/2014 | Lehrian | ................. | G06F 3/0486 |
| | | | | 715/802 |
| 2014/0130090 A1* | 5/2014 | Krikorian | ............ | H04N 5/4403 |
| | | | | 725/37 |

(Continued)

OTHER PUBLICATIONS

"Motion 5 User Manual" by Apple, Inc. Published at https://help.apple.com/motion/mac/5.0/en/motion/usermanual/ on or before Jun. 24, 2011 per Internet Archive Wayback Machine capture. 1472 pages. (Year: 2011).*

*Primary Examiner* — Mahelet Shiberou
(74) *Attorney, Agent, or Firm* — Kilpatrick Townsend & Stockton LLP

(57) ABSTRACT

Embodiments for manipulating an object, such as an image, are described. For example, a content application renders the object and supports multiple manipulation modes. A GUI of the application is available at a touch screen of a computing device. A mapping of standard touch screen gestures and object manipulations are defined for each manipulation mode. One of the modes is a standard manipulation mode that supports standard object manipulations. At least one other mode is a special manipulation mode. In this special mode, the standard user gestures are mapped to application-defined manipulations that are different from the standard object manipulations. Based on a user selection of one of the manipulation modes, the selected mode is activated. While in the activated manipulation mode, a standard user gesture is received and the relevant object manipulation is applied to the object.

20 Claims, 11 Drawing Sheets

(56) References Cited

U.S. PATENT DOCUMENTS

2015/0046884 A1\* 2/2015 Moore ................ G06F 3/0481
                                                715/863
2015/0186004 A1\* 7/2015 Gordon ............... G01O 21/367
                                                345/173

\* cited by examiner

SMART MULTI-TOUCH LAYOUT CONTROL FOR MOBILE DEVICES

TECHNICAL FIELD

This disclosure relates generally to the field of graphical user interfaces (GUIs), and more specifically to a multiple mode touch screen GUI.

BACKGROUND

Many content applications render objects, such as images, graphics, text, and other multimedia components. Some of the content applications also enable the manipulation of objects via their GUIs. For example, a GUI can support different types of user interactions to edit the properties of a rendered object and change its look and feel.

Interaction with a content application can occur via a device that supports touch screen technology. Typically in this case, the content application supports a touch screen GUI. Objects are manipulated using different natural touch screen gestures, such as a tap, a hold, a drag, or another touch screen gesture to perform various screen or object manipulation tasks. The mapping between the natural touch screen gesture of a user and the underlying manipulation of an object by an application is typically defined by the operating system and has been popularized to be a de facto standard for interacting with the device. In other words, users expect that certain natural touch screen gestures will result in particular manipulations. For this reason, applications will typically reuse the same mapping such that these gestures result in the same manipulations, thereby avoiding user confusion. For instance, the content application renders a canvas that includes an image. In response to a tap-and-hold interaction at the proper GUI location, the image is selected. Upon a drag to the right, the image is moved in that direction on the canvas. This interaction is consistent with the user expectation of how to use a tap and hold gesture and a drag gesture.

However, while limiting the mapping of the natural touch screen gestures to specific manipulations avoids user confusion, this forces an application provider to define new touch screen gestures in order provide touch controls over different manipulations. These new gestures may not be natural or intuitive.

Rather than defining new gestures, providers and users may create new systems of using the existing gestures and their common interactions to achieve the same end. However, this can limit the accuracy, repeatability, and efficiency of particular object manipulations. In an example involving horizontal movement of the image, whether the drag results in the correct horizontal movement or in an incorrect angled movement depends on the precision of the drag gesture. A user may avoid this challenge by zooming onto the image and performing a series of smaller drags. However, this approach increases the number of touch screen gestures. As this number increases, the utilization of the underlying computing resources (e.g., processor and memory) involved in this interaction and, conversely, the efficiency of performing the interaction decreases.

The size of the object or the size of the touch screen also limit the accuracy, repeatability, and efficiency of performing the manipulation. Generally, the smaller the object, the less accurate the manipulation becomes. Similarly, the device sensitivity for measuring the touch screen gesture decreases with a decrease in the size of the touch screen. In turn, the room for error increases. As in the previous example, to improve the accuracy, a single touch screen gesture can be divided into multiple, smaller touch screen gestures. However, this accuracy improvement penalizes the computational efficiency of manipulating the object.

SUMMARY

Systems and methods for manipulating an object rendered at a GUI of a content application running on a computing device are described. In an example, a manipulation model of the content application maps standard user gestures to standard manipulations and to application-defined manipulations based on selectable manipulation modes. A selection of a user to enter a special manipulation mode from the selectable manipulation modes is received by the content application. While in the special manipulation mode, the content application further receives a gesture input of the user to manipulate the object. The gesture input is one of the standard user gestures. Based on the manipulation model and the selection of the special manipulation mode, the content application maps the received gesture input to an application-defined manipulation. The application-defined manipulation is different from a standard manipulation defined by the manipulation model for the received gesture input. The content application executes the application-defined manipulation on the object.

To illustrate, consider an example of moving an image from one location to another location on a canvas rendered at the GUI. In this example, the content application supports at least two manipulation modes: a standard mode and a constrained mode. If the standard mode is active, a drag of the image via the touch screen results in relocating the image according to the pixel coordinates of the drag. In comparison, the constrained mode constrains the drag to a horizontal movement or a vertical movement based on the relevant direction. Hence, if the constrained mode is active and if the drag is substantially horizontal, the image is moved to a new location that is horizontally aligned with the original location.

Each manipulation mode can support a specific set of object manipulations. By associating a same standard touch screen gesture with different object manipulations across the different manipulation modes, the number of object manipulations that the content application supports can be increased without having to define new touch screen gestures. In addition, particular object manipulations are defined and enable accurate, repeatable, and efficient manipulations by activating the respective manipulation mode(s) and performing the associated standard touch screen gesture(s).

These illustrative embodiments are mentioned not to limit or define the disclosure, but to provide examples to aid understanding thereof. Additional embodiments are discussed in the Detailed Description, and further description is provided there.

DETAILED DESCRIPTION

Figure 1:
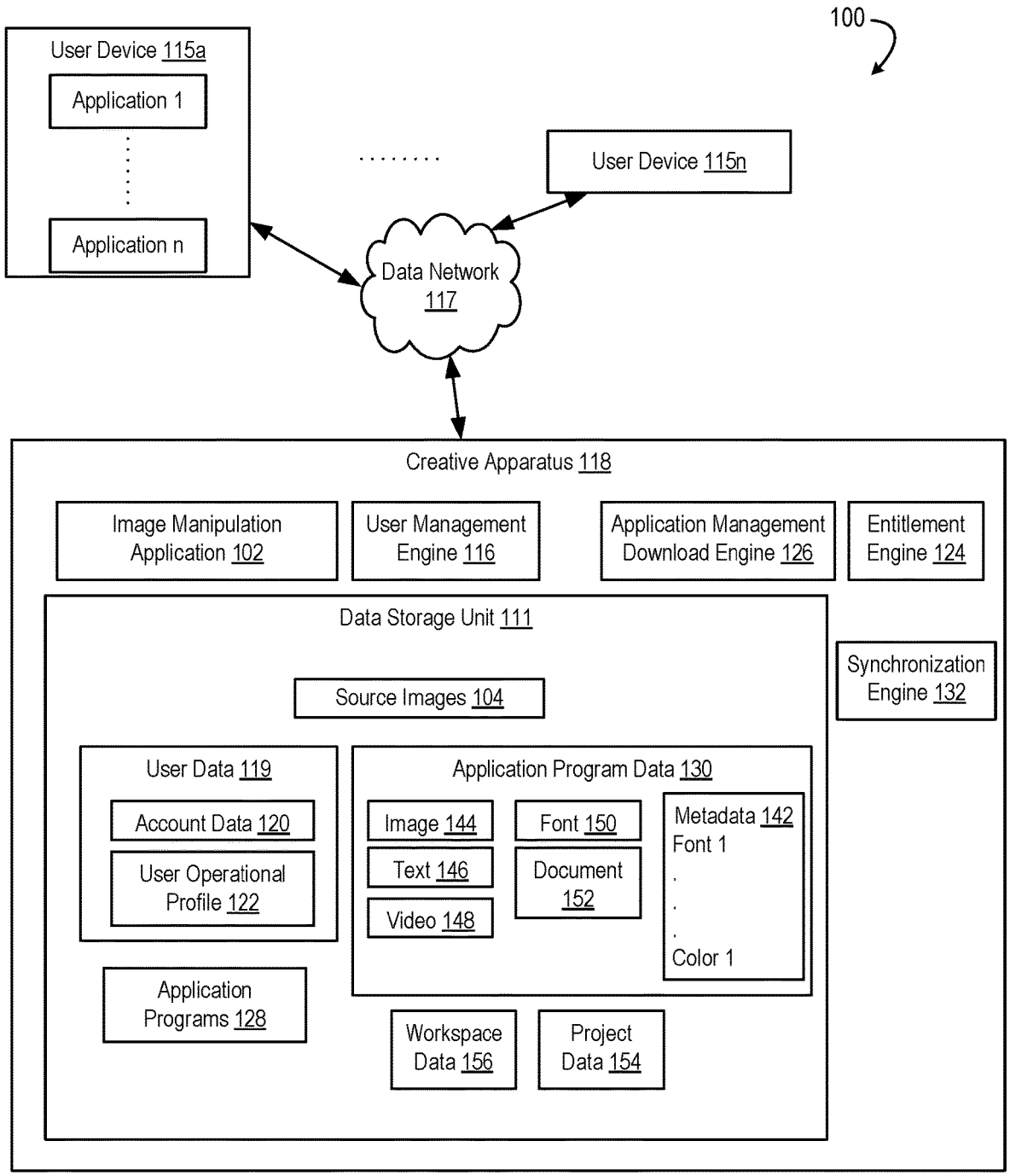
FIG. 1 depicts an example of a network environment for using a content application that supports multiple manipulation modes via a touch screen GUI, according to certain embodiments.

The present disclosure describes systems and methods for providing a multiple mode touch screen GUI. A content application renders objects in the GUI and supports manipulations of rendered objects. In each mode, touch screen gestures are mapped to particular object manipulations that the content application supports. This mapping can be a one-to-one mapping in each mode and a one-to-many mapping across the different modes. In other words, a same touch screen gesture is usable to perform different object manipulations depending on the mode in which the touch screen interaction is received at the GUI.

In an example, a standard set of touch screen gestures is mapped to a standard manipulation model. This mapping may be defined by an operating system or a content application of a device. Regardless, the mapping allows a user to manipulate an object rendered on a touch screen of the device in a standard mode, as commonly expected. Unlike the prior art systems, to support additional object manipulations, no new gestures or series of existing gestures need to be defined. Instead, the mapping can be augmented for a new mode. The existing, standard gestures are mapped to the additional object manipulations in the new mode. Hence, in the standard mode, the user can provide a standard touch screen gesture, resulting in a standard manipulation of the rendered object. The user can also invoke the new mode to use the same standard touch screen gesture but for a different non-standard manipulation of the rendered object.

In an example involving horizontal movement of an image, a content application supports a standard mode and a constrained mode, among other modes. A drag gesture is mapped to two different object manipulations, one in each mode. In the standard mode, the drag gesture is mapped to a free movement that closely follows the pixel coordinates of the gesture. In the constrained mode, the drag gesture is constrained to either a horizontal movement or a vertical movement, depending on the likelihood of whether the pixel coordinates indicate a horizontal or vertical gesture. To interact with the content application, a user can operate a portable device that includes a touch screen. If the standard mode is selected, a drag of the image results in the content application relocating the image according to the free movement. By contrast, if the constrained mode is selected, the drag results in either a controlled horizontal or vertical relocation. Thus, depending on the mode, the same standard gesture (a drag) can result in two different manipulations of the image.

By using a one-to-many mapping, multiple modes are enabled. Some embodiments involving multiple modes improve the accuracy, repeatability, and efficiency of manipulating objects and the responsiveness of the content application as compared to existing systems. Specifically, the disclosed embodiments reduce or eliminate the need to limit the number of supported object manipulations to the number of possible touch screen gestures. Rather than having to define a new touch screen gesture to support a new object manipulation, an existing touch screen gesture can be used instead by mapping the gesture to the new object manipulation in a relevant mode. Thus, even with a limited number of possible touch screen gestures, the number of supported object manipulations can be virtually unlimited.

In additional embodiments, a particular mode is specifically configured for particular object manipulations. Touch screen gestures are constrained to these object manipulations in this mode regardless of their precisions, object size, screen size, or device touch screen sensitivity. By constraining the gestures, the content application performs the particular object manipulations in an accurate, computationally efficient, and repeatable manner. In the horizontal-movement example involving an image, the content application moves the image in a controlled manner in the constrained mode, thereby reducing the impact of imprecisions in the user's drag and avoiding the need to divide the movement into a zoom and multiple, smaller drags.

In an example, the content application stores, in addition to the mappings, a set of rules for selecting a mode from the supported modes. Parameters of a touch screen gesture are compared to conditions of the rule to automate the selection. Once selected, the content application renders an indicator of the mode at the GUI. The indicator informs the user of the selected mode, thereby enhancing the user experience. While performing an object manipulation, the content application updates the existing indicator or renders a new indicator to describe the object manipulation. This type of information increases the awareness of the user and, thereby, further enhances the user experience.

As used herein, the term "content application" refers to an application executable on a computing device or system. Upon execution, the application renders content at a GUI and facilitates manipulation of the content based on user interactions at the GUI. The manipulation includes editing one or more properties of the content, where the properties relate to the rendering of the content at the GUI. Adobe Comp CC® from Adobe Systems, Incorporated is a specific example of a content application.

As used herein, the term "user interaction" refers to input of a user to the content application via the GUI. The input can depend on the input/output that the underlying computing device or system supports. For instance, if touch screen technology is supported, the user interaction includes touch screen input. As used herein, the term "user gesture" refers one particular type of user interaction. Specifically, user gesture refers to touch screen input (i.e., user interaction via a touch screen GUI). Examples of user gestures include a single tap, a double tap, a hold, a push, a drag, a single touch, a multi-touch, and other touch screen interactions. Generally, a touch screen input that includes movement of the input element (e.g., a user's single or multiple fingers) relative to the touch screen can be referred to herein as a user gesture, or equivalently, a touch screen gesture or gesture input.

As used herein, the term "object" refers to a type of electronic content that can be rendered or edited by the content application. Images, graphic components, text, and other multimedia content are examples of objects. In some embodiments, properties define how and where the object should be rendered. The content application renders the object at a specific location of the GUI according to these properties.

As used herein, the term "object manipulation" refers to a manipulation available from the content application and applicable to the object. The manipulation edits one or more of the properties associated with the object based on a user interaction. An edit changes how or where the object is rendered at the GUI.

As used herein, the term "manipulation mode" refers to a mode available from the content application. In the mode, the content application supports a particular set of object manipulations. To do so, a mapping of user interactions to object manipulations is defined for the mode and is stored locally or is accessible remotely to the content application.

As used herein, the term "manipulation model" refers to a model that stores object manipulations that correspond to user interactions. The model can store the relevant mapping of user interactions to object manipulations.

As used herein, the term "standard set of user interactions" refers to a set of user interactions that are commonly supported by different operating systems, by different applications running on a same operating system, by a same application running on different operating systems, or by different applications running on different operating systems. Similarly, as used herein, the term "standard manipulation model" refers to a manipulation model that is commonly supported by different operating systems, by different applications running on a same operating system, by a same application running on different operating systems, or by different applications running on different operating systems.

In the interest of clarity of explanation, manipulation of images are described herein. However, the embodiments of the present disclosure are not limited as such. Instead, the embodiments similarly apply to other types of objects, where the manipulation may depend on the object type and the supported manipulation modes.

Referring now to the drawings, FIG. 1 is a diagram depicting an example of a network environment 100 for using a content application that supports multiple manipulation modes via a touch screen GUI, according to certain embodiments. In the example depicted in FIG. 1, an image manipulation application 102 is depicted as an example of the content application. The image manipulation application 102 uses a set of rules to determine what manipulation mode should be selected. For the selected mode, the image manipulation application 102 relies on a mapping of touch screen gestures to object manipulations to enable accurate edits to objects rendered on the GUI in a user-friendly and repeatable manner.

In some embodiments, the image manipulation application 102 is executed by a creative apparatus 118 using data stored on a data storage unit 111 (e.g., one or more of the source images 104). In additional or alternative embodiments, the image manipulation application 102 is executed by another device, such as a user device 115a, using data stored on a data storage unit 111 (e.g., a data storage unit storing one or more of the source images 104,) or data stored on another non-transitory, computer-readable medium (e.g., a non-transitory, computer-readable medium storing one or more of the source images 104).

In some embodiments, the environment 100 includes user devices, such as user devices 115a-n. Each of the user devices is connected to either a creative apparatus 118 or a marketing apparatus, or both, via a data network 117. A user of the user devices uses various products, applications, or services supported by the creative apparatus 118 via the data network 117.

The user devices 115a-n correspond to various users. Examples of the users include, but are not limited to, creative professionals or hobbyists who use creative tools to generate, edit, track, or manage creative content; marketing professionals who use marketing tools to generate, edit, track, or manage online content or online marking processes; end users; administrators; users who use image tools to create, edit, track, or manage images, advertisers, publishers, developers, content owners, content managers, content creators, content viewers, content consumers, designers, editors, any combination of these users; or any other user who uses digital tools to create, edit, track, or manage digital experiences.

Digital tools, as described herein, include a tool that is used to perform a function or a workflow electronically. Examples of a digital tool include, but are not limited to, a creation tool, content editing tool, content publishing tool, content tracking tool, content managing tool, content printing tool, content consumption tool, any combination of these tools, or any other tool that can be used for creating, editing, managing, generating, tracking, consuming, or performing any other function or workflow related to content. Digital tools include the creative apparatus 118. Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content. Content, as described herein, includes electronic content. Examples of content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

Examples of the user devices include, but are not limited to, a personal computer, a smartphone, a mobile phone, a tablet computer, a desktop computer, a processing unit, any combination of these devices, or any other suitable device having one or more processors. Each user device includes at least one application supported by the creative apparatus 118. It is to be appreciated that following description is now explained using the user device 115a as an example and any other user device can be used. Examples of the data network 117 include, but are not limited to, internet, local area network (LAN), wireless area network, wired area network, wide area network, and the like.

The creative apparatus 118 includes one or more engines for providing one or more digital experiences to the user. In some embodiments, these engines include one or more of the engines depicted in FIG. 1. In other embodiments, one or more of the engines depicted in FIG. 1 may be omitted from the creative apparatus 118.

The creative apparatus 118 can be implemented using one or more servers, one or more processing devices, one or more platforms with corresponding application programming interfaces, cloud infrastructure, or the like. In addition, each engine can also be implemented using one or more servers, one or more processing devices, one or more platforms with corresponding application programming interfaces, cloud infrastructure, or the like. The creative apparatus 118 also includes a data storage unit 111. The data storage unit 111 can be implemented as one or more databases or one or more data servers. The data storage unit 111 includes data that is used by the engines of the creative apparatus 118.

In some embodiments, a user of the user device 115a visits a webpage or an application store to explore applications supported by the creative apparatus 118 (e.g., the image manipulation application 102). The creative apparatus 118 provides the applications (e.g., the image manipulation application 102) as a software as a service (SaaS), or as a standalone application that can be installed on the user device 115a, or as a combination.

In some embodiments, the user creates an account with the creative apparatus 118 by providing user details and by creating login details. Alternatively, the creative apparatus 118 can automatically create login details for the user in response to receipt of the user details. In some aspects, the user is also prompted to install an application manager. The application manager enables the user to manage installation of various applications supported by the creative apparatus 118 and to manage other functionalities, such as updates, subscription accounts, and the like, associated with the applications. The user details are received by a user management engine 116 and stored as user data 119 in the data storage unit 111. In some aspects, the user data 119 further includes account data 120 under which the user details are stored.

In some embodiments, the user either can opt for a trial account or can make payment based on the type of account or subscription chosen by the user. Alternatively, the payment can be based on product or number of products chosen by the user. In some embodiments, based on payment details of the user, a user operational profile 122 is generated by an entitlement engine 124. The user operational profile 122 is stored in the data storage unit 111 and indicates entitlement of the user to various products or services. In some embodiments, the user operational profile 122 also indicates type of user, i.e., free, trial, student, discounted, or paid. In some embodiments, the user management engine 116 and the entitlement engine 124 can be one single engine performing the functionalities of both the engines.

In some embodiments, the user installs various applications supported by the creative apparatus 118 via an application management download engine 126. Application installers or application programs 128, which may include a copy of the image manipulation application 102 or other software usable with the image to perform operations described herein, are present in the data storage unit 111 and are fetched by the application management download engine 126. These application are made available to the user directly or via the application manager. In some embodiments, all application programs 128 are fetched and provided to the user via an interface of the application manager. In other embodiments, application programs 128 for which the user is eligible based on user's operational profile are displayed to the user. The user selects the application programs 128 or the applications that the user wants to download. The application programs 128 are downloaded on the user device 115a by the application manager via the application management download engine 126. Corresponding data regarding the download is also updated in the user operational profile 122. An application programs 128 is an example of a digital tool. The application management download engine 126 also manages a process of providing updates to the user device 115a.

In some embodiments, upon download, installation, and launching of an application program, the user is asked to provide the login details. A check is again made by the user management engine 116 and the entitlement engine 124 to ensure that the user is entitled to use the application program. In other embodiments, direct access is provided to the application program as the user is already logged into the application manager.

The user uses one or more application programs 128 to create one or more projects or assets. In addition, the user also has a workspace within each application program. The workspace, as described herein, includes setting of the application program, setting of tools or setting of user interface provided by the application program, and any other setting or properties specific to the application program. Each user has a workspace. The workspace, the projects, or the assets are then stored as application program data 130 in the data storage unit 111 by a synchronization engine 132. The application program data 130 can be specific to the user or can be shared with other users based on rights management.

In some embodiments, the application program data 130 includes one or more assets 140. The assets 140 can be a shared asset that the user wants to share with other users or that the user wants to offer on a marketplace. The assets 140 can also be shared across multiple application programs 128. In some embodiments, each asset includes metadata 142. Examples of the metadata 142 include, but are not limited to, font, color, size, shape, coordinate, a combination of any of these, and the like.

In some embodiments, each asset also includes a file. Examples of the file include, but are not limited to, an image 144, text 146, a video 148, a font 150, a document 152, a combination of any of these, and the like. In another aspect, an asset only includes the metadata 142. The application program data 130 also include project data 154 and workspace data 156. In some embodiments, the project data 154 includes the assets 140. In additional or alternative embodiments, the assets 140 are standalone assets. Similarly, the workspace data 156 can be part of the project data 154 in some embodiments and may be standalone data in other embodiments.

In some embodiments, the user can have one or more user devices. The application program data 130 is accessible by the user from any device, including a device that was not used to create the assets 140. This is achieved by the synchronization engine 132 that stores the application program data 130 in the data storage unit 111 and makes the application program data 130 available for access by the user or other users via any device. Before accessing the application program data 130 by the user from any other device or by any other user, the user or the other user may need to provide login details for authentication if not already logged in. Else, if the user or the other user is logged in, then a newly created asset or updates to the application program data 130 are provided in real time. The workspace data 156 enables the synchronization engine 132 to provide same workspace configuration to the user on any other device or to the other user based on rights management data.

Figure 2:
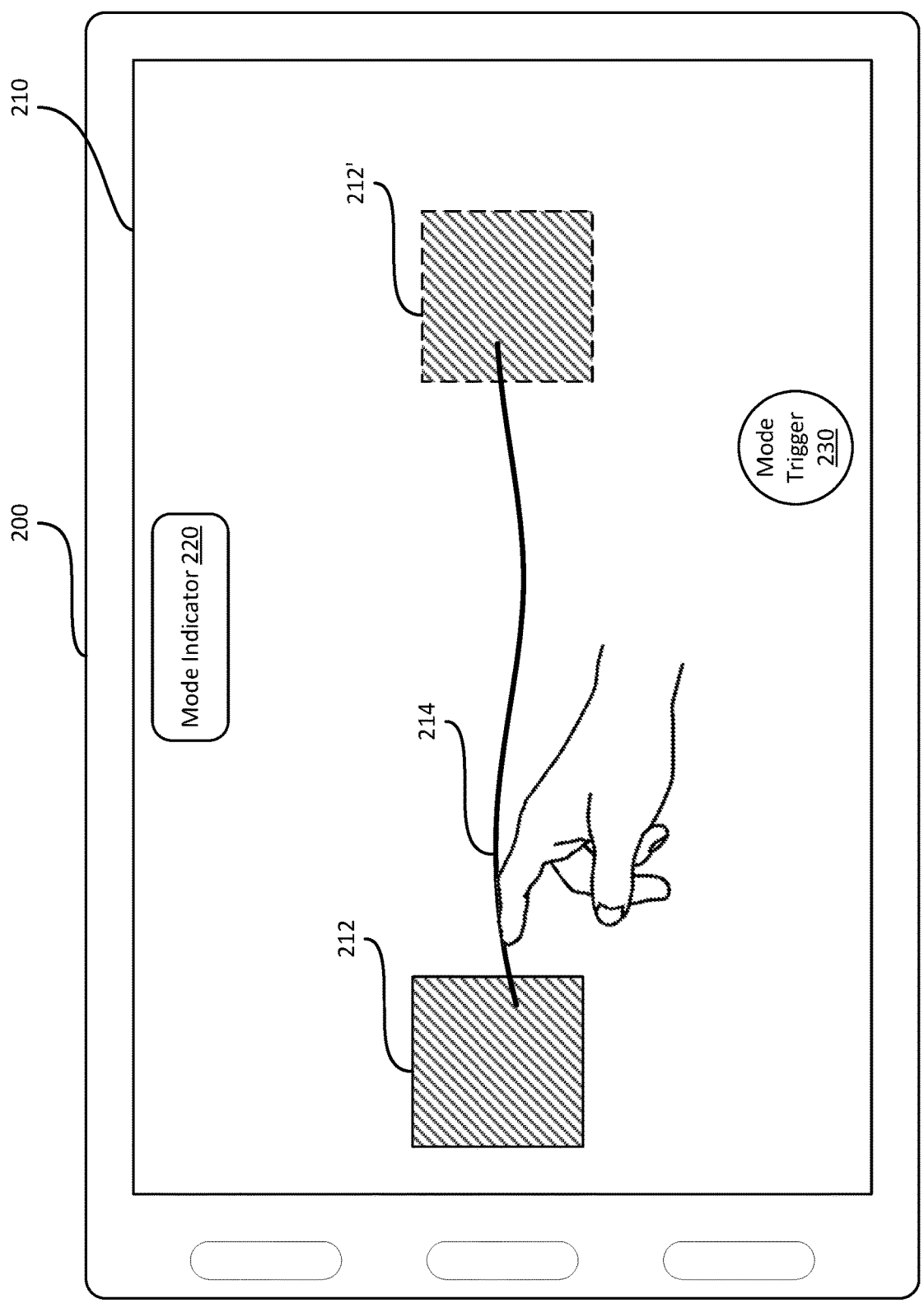
FIG. 2 illustrates an example object manipulation via a GUI of a content application, according to certain embodiments.

FIG. 2 illustrates an example object manipulation via a GUI 210 of a content application, according to certain embodiments. In the depicted example, a user operates a computing device 200 to interact with the content application. The content application can be hosted locally at the computing device 200. Alternatively, the content application can be hosted on a remote server and an instance thereof can be running on the computing device 200. Regardless, the GUI 210 is presented at an input/output (I/O) interface of the computing device 200, where the I/O interface supports touch screen technology. For example, the I/O interface is a touch screen display. In this case, the GUI 210 can be referred to as a touch screen GUI as it enables user gestures to interact with the content application.

The content application renders an image 212 (or, more generally, an object or collection of objects) at the GUI 210 and enables touch screen gestures 214 of the user with the image 212 via the GUI 210. For example, the touch screen gestures 214 include a tap and a hold of the image 212 to select the image 212 and a drag (illustrated to the right hand side of FIG. 2) to relocate the image to a new location at the GUI. FIG. 2 illustrates the relocated image as image 212'.

The content application supports multiple manipulation modes. Particular manipulation modes can be defined to support specific object manipulations (or, in the example of FIG. 2, image manipulations) such that the performance of these manipulations is accurate, easy, user friendly, and repeatable and such that their execution is computationally efficient. In each mode, a mapping between user gestures and the mode-supported object manipulations exists and is used to control the selection and application of one of the object manipulations. In an example, one manipulation mode is defined to support standard manipulations given a standard set of user gestures. This manipulation mode is referred to herein as a standard mode. One or more other manipulations modes are also defined. Each of these modes support application-defined manipulations given the same standard set of user gestures. An application-defined manipulation represents an object manipulation that is specifically defined for or supported by the application and that is typically different from a standard object manipulation.

For example, the content application supports a standard manipulation mode and a constrained manipulation mode, among other manipulation modes. Each manipulation mode has a mapping of user gestures to object manipulations. In the standard mode, the mapping does not constrain the user gestures and specifies default object manipulations. Accordingly, the content application processes the touch screen gesture 214 (e.g., the drag to the right) as a free movement that closely follows the pixel coordinates of the drag. The relocated image 212' can be positioned at any location of the GUI 210 depending on the pixel coordinates. In comparison, in the constrained mode, the mapping constrains the object manipulations. For example, a drag along the horizontal axis within plus or minus forty-five degrees is constrained to a horizontal movement. A drag along the vertical axis within plus or minus forty-five degrees is constrained to a vertical movement. Hence, the touch screen gesture 214 would result in the relocated image 212' being aligned horizontally from the original position of the image 212. These and other object manipulations and other manipulation modes are further illustrated in the next figures.

To enhance the user experience, the content application renders an indicator of the manipulation mode (illustrated as a mode indicator 220). The indicator identifies the manipulation mode to the user. For example, a textual or graphical description of the manipulation mode is rendered in a user interface (UI) element, such as a bubble, a popup, or some other UI element type. While the content application is performing an object manipulation, the mode indicator 220 or a separate indicator (e.g., another UI element) can be updated to also identify the object manipulation.

In an example, a mode trigger 230 enables the activation or deactivation of a manipulation mode. The mode trigger 230 represents trigger data available to the content application in order to perform the activation or deactivation. Different techniques exist for generating the trigger data.

In an example, the trigger data is generated based on a dedicated button. The dedicated button can be a hard button of the computing device 200 or a soft button of the GUI 210 (e.g., a dedicated menu option) that identifies the available manipulation modes and allows the user to select a desired one. A user interaction with the dedicated button results in the trigger data. If this interaction selects a particular manipulation mode, the content application activates that mode. Similarly, if a particular manipulation mode is deselected, the content application deactivates the mode.

In another example, the trigger data is generated absent a dedicated button. Instead, the content application relies on a set of rules for selecting (e.g., activating) and deselecting (e.g., deactivating) a manipulation mode. The rules specify the standard mode as the default manipulation mode and a set of parametric conditions to switch from this mode to another one. The parametric conditions include, for instance, the number of touches on the touch screen (e.g., the GUI 210), a time duration of each touch, and the movement of the touch during the time duration. These and other parametric conditions are further illustrated in the next figures. In this example, the trigger data represents touch screen data of a touch screen gesture at any location on the GUI 210. The content application compares the touch screen data to the parametric conditions and determines whether a particular manipulation mode should be switched to, and if so, activates this mode and deactivates the existing one. If the parameters change over time, the activated manipulation mode may be deactivated and another manipulation mode may become active, and so on and so forth.

Figure 3A:
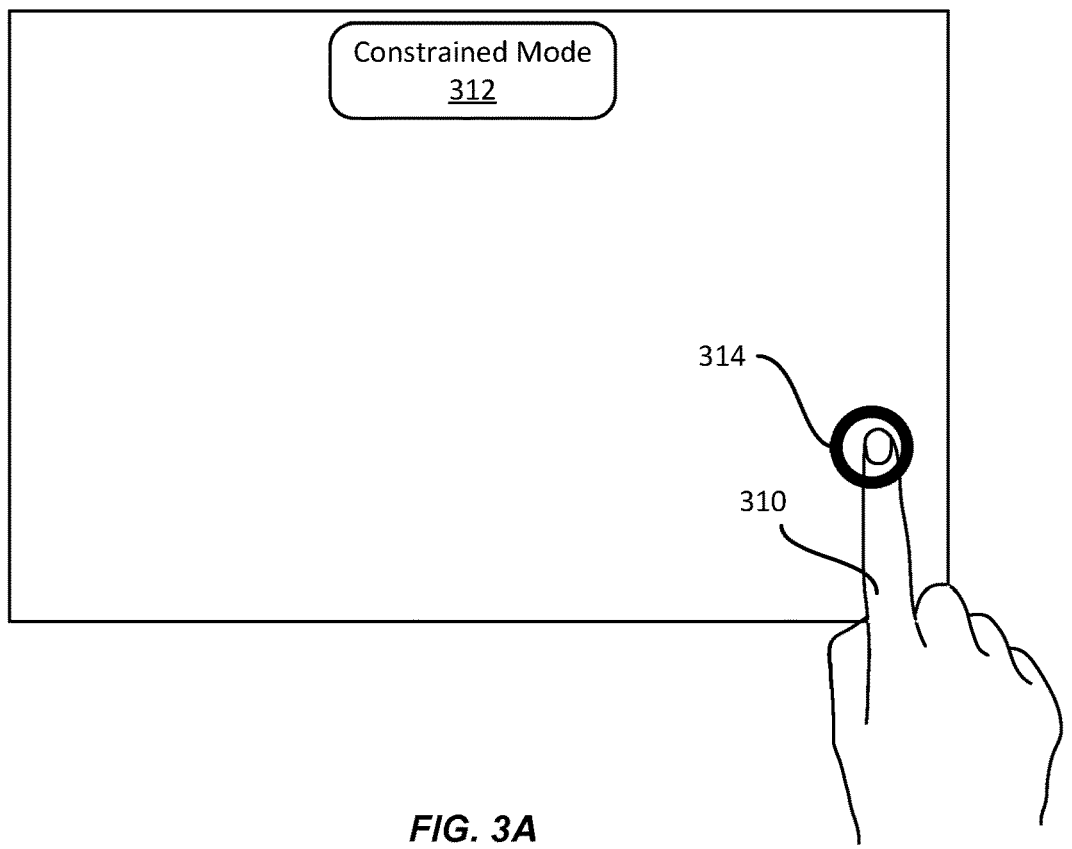
FIG. 3A and FIG. 3B depict examples of selecting manipulation modes without the use of a dedicated button, according to certain embodiments.
Figure 3B:
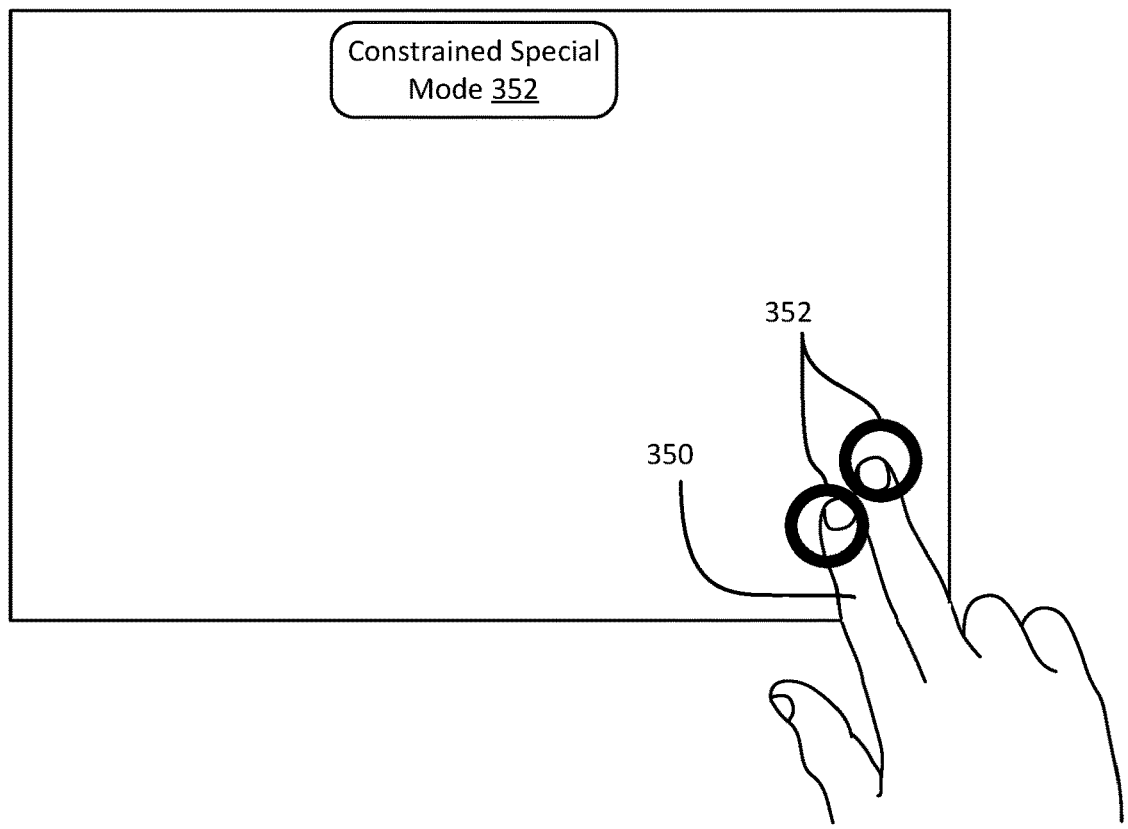

FIGS. 3A and 3B describe examples of selecting manipulation modes without the use of a dedicated button, according to certain embodiments. The mode trigger is touch screen data that a content application analyzes according to a set of rules. In both figures, a standard mode is set as the default manipulation mode. If parameters of touch screen data meet the parametric conditions defined by the rules, a respective manipulation mode is selected and activated in lieu of the standard mode.

In FIG. 3A, a user can tap and hold a single finger at any location on a GUI. This tap and hold is illustrated as a touch screen gesture 310. Given that the number of touches is one and if the hold time exceeds a time threshold (e.g., half a second), a constrained mode is selected. Otherwise, the default standard mode remains active. Here, the set of rules define three parametric conditions, among others: the number of touches need to be one, the touch should be relatively static (e.g., the corresponding pixel movement less than a predefined pixel threshold), and the hold time should exceed the time threshold. If the touch screen data violates any of these conditions, the constrained mode is not activated.

In an example, once selected, the hold can be released and the constrained mode remains active until another user gesture is detected at the GUI. In this way, the user's finger can be freed. In another example, the constrained mode remains active only during the period of time when the parametric conditions are still satisfied. As soon as one of the parametric conditions is violated, the constrained mode is automatically deactivated. For instance, the finger may remain held at the same location for five additional seconds. During this five second time period, the constrained mode is active. At the end of it, the standard mode is activated. The set of rules can define which of the two approaches should be used.

When the constrained mode is activated, a mode indicator 312 is updated to describe this mode. In addition, a UI element 314, illustrated as a ring, is rendered at the location of the tap and hold on the GUI. The UI element 314 represents another type of an indicator that increases the user's awareness of the selected manipulation mode.

In FIG. 3B, a user can tap and hold two fingers at any location on a GUI. This tap and hold is illustrated as a touch screen gesture 350. Given that the number of touches is two and if the hold time exceeds a time threshold (e.g., half a second), a constrained special mode is selected. Otherwise, the default standard mode remains active. Here, the set of rules define three parametric conditions, among others: the number of touches need to be two, the touch should be relatively static (e.g., the corresponding pixel movement less than a predefined pixel threshold), and the hold time should exceed the time threshold. If the touch screen data violates any of these conditions, the constrained special mode is not activated. Here also, the content application render a mode indicator 352 that describes the constrained special mode and a UI element 354 that indicates that this mode has been activated.

Some of the parametric conditions are common between the constrained mode and the special constrained mode. For example, the threshold time and the relative movement are the same, while the number of touches is different. The commonality enables switching between these two modes directly (e.g., without a transition through the default standard mode). For instance, once the constrained mode is active, if a second finger is tapped and held in place for sufficient time, the content application switches directly to the constrained special mode. If subsequently, the second finger is released while the first finger is still in place, the content application switches back directly to the constrained mode. If the first finger is then released, the standard mode is activated.

Generally, commonality between the parametric conditions also enable a definition of a hierarchy of manipulation modes. Each manipulation mode can correspond to a level of the hierarchy. Two consecutive levels of the hierarchy share at least one parametric condition. In this way, the content application can switch directly between two manipulation modes that correspond to two consecutive hierarchical levels without having to transition through the default manipulation mode. As illustrated in FIGS. 3A and 3B, the constrained and constrained special modes are two consecutive modes. The common parametric conditions (e.g., timing and movement of the touch(es)) of the touch screen gesture enable the direct switching between these two modes simply by varying uncommon parametric condition (e.g., the number of touches).

Other parametric conditions are also possible to define in the set of rules. Some of these conditions need not relate to the touch screen gesture 310 or 350. For example, the set of rules can specify that at least one object (e.g., an image) rendered at the GUI has to be also selected. The set of rules can also specify whether the selection needs to occur prior to the touch screen gesture 310 or 350 or once it is initiated.

Figure 4A:
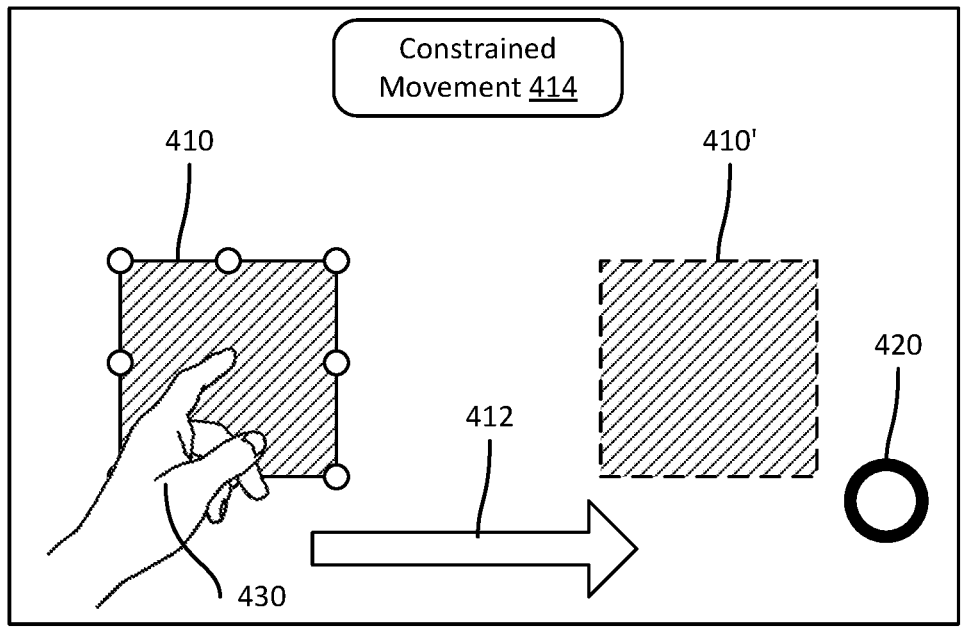
FIG. 4A and FIG. 4B illustrate examples of two different object manipulations based on a same interior drag gesture, according to certain embodiments.
Figure 4B:
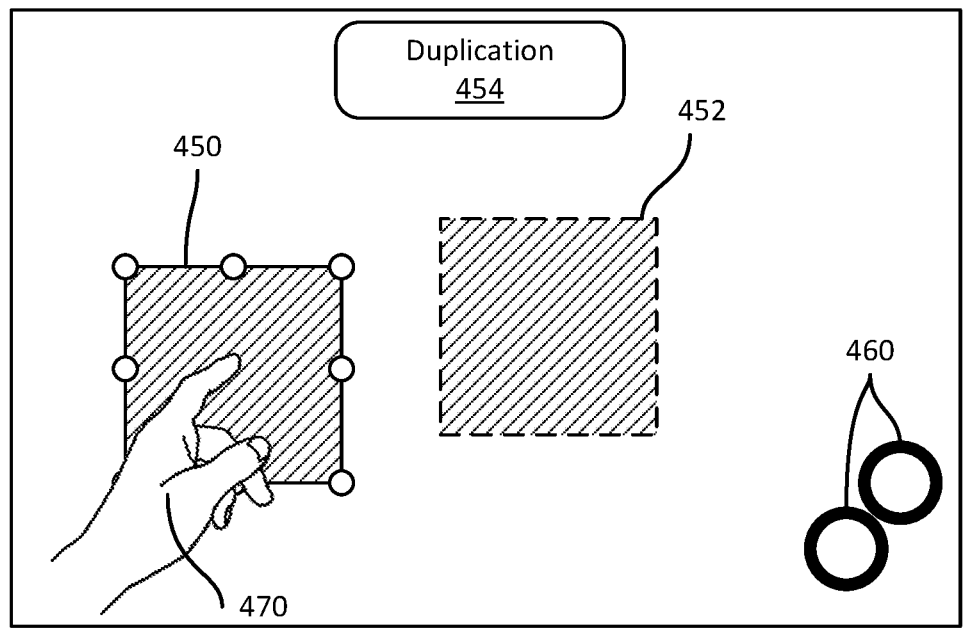

FIGS. 4A and 4B illustrate examples of two different object manipulations based on a same interior drag gesture, according to certain embodiments. By using this touch screen gesture, an interior of a rendered object is tapped, held, and dragged in a certain direction. In a standard mode, the interior drag results in a free movement of the object. The interior drag and the free movement are examples of a standard user gesture and a standard manipulation, respectively, that are commonly supported across different applications or different operating systems. An interior drag gesture can be mapped to a standard manipulation model that includes a free movement manipulation.

In FIG. 4A, an image 410 is rendered at the GUI and is selected (e.g., via a double tap). This selection is illustrated with dots laid over the corners and edge centers of the image 410. A constrained mode is active, as shown with a UI element 420. An interior drag gesture 430 is applied to the image 410. In the constrained mode, a mapping of user gestures to object manipulations indicates that the interior drag gesture 430 is mapped to a horizontal or vertical movement. Given that the drag is horizontal, the content application relocates 412 the image horizontally. The content application also updates a mode indicator 414 to describe that the object manipulation is a constrained movement. The relocated image is illustrated as image 410 horizontally aligned with the original location of the image 410.

In FIG. 4B, an image 450 is rendered at the GUI and is selected. A constrained special mode is active, as shown with a UI element 460. An interior drag gesture 470 is applied to the image 450. In the constrained special mode, a mapping of user gestures to object manipulations indicates that the interior drag gesture 470 is mapped to an object duplication. Accordingly, the content application duplicates the image 450 by generating and rendering a copy image 452 at the GUI. The content application also updates a mode indicator 454 to describe that the object manipulation is a duplication. The constrained horizontal or vertical movement of FIG. 4A and the object duplication of FIG. 4B are examples of an application-defined manipulation.

Figure 5A:
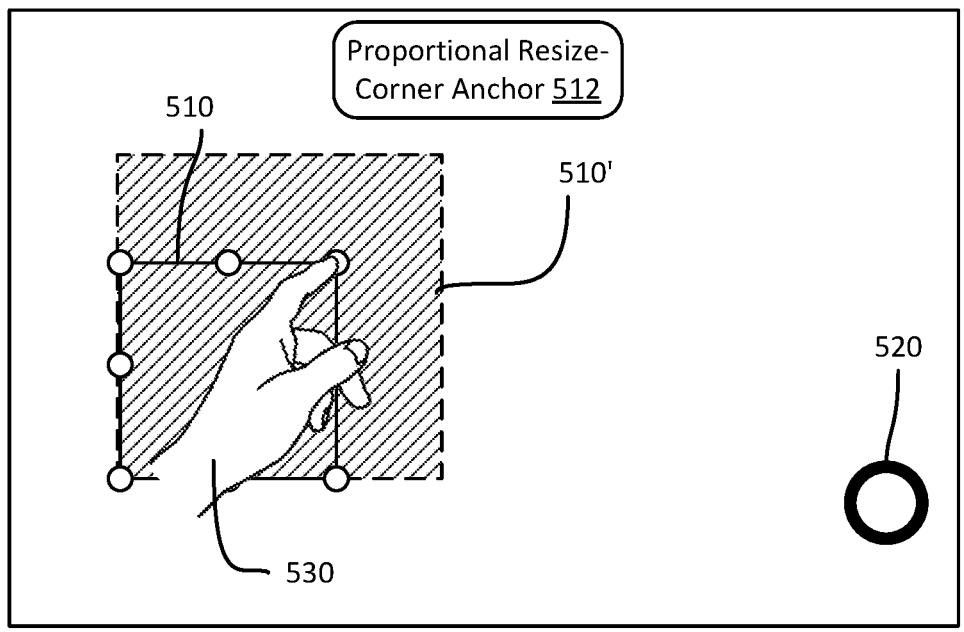
FIG. 5A and FIG. 5B illustrate examples of two different object manipulations based on a same corner drag gesture, according to certain embodiments.
Figure 5B:
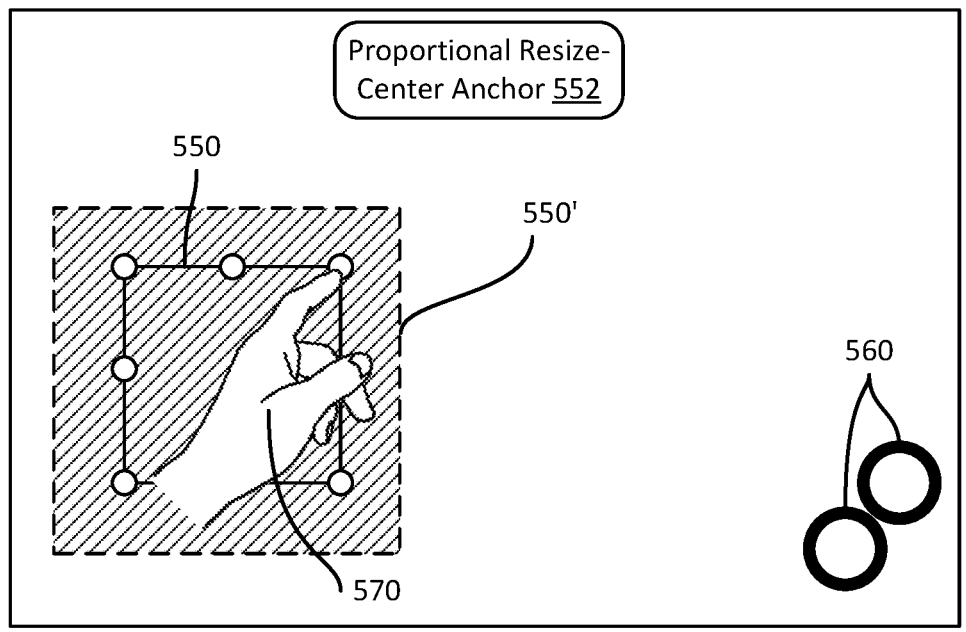

FIGS. 5A and 5B illustrate examples of two different object manipulations based on a same corner drag gesture, according to certain embodiments. By using this user gesture, a corner of a rendered object is tapped, held, and dragged in a certain direction. In a standard mode, the corner drag results in an disproportional resize of the object. The corner drag and the disproportional resize are examples of a standard user gesture and a standard manipulation, respectively, that are commonly supported across different applications or different operating systems. A corner drag gesture can be mapped to a standard manipulation model that includes a disproportional resize manipulation.

In FIG. 5A, an image 510 is rendered at the GUI and is selected. A constrained mode is active, as shown with a UI element 520. A corner drag gesture 530 is applied to the image 510. In the constrained mode, a mapping of user gestures to object manipulations indicates that the corner drag gesture 530 is mapped to a proportional resize. While, the opposite corner anchored, the resize is performed by proportionally moving the remaining corners and expanding the image 510. The content application also updates a mode indicator 512 to describe that the object manipulation is a proportional resize with an anchored corner. The resized image is illustrated as image 510'.

In FIG. 5B, an image 550 is rendered at the GUI and is selected. A constrained special mode is active, as shown with a UI element 560. A corner drag gesture 570 is applied to the image 550. In the constrained special mode, a mapping of user gestures to object manipulations indicates that the corner drag gesture 570 is mapped to a proportional resize. In this resize, none of the corners are anchored. Instead, the center of the image 550 is anchored such that the resize is performed by proportionally moving all corners and expanding the image 550. The content application also updates a mode indicator 552 to describe that the object manipulation is a proportional resize with an anchored center. The resized image is illustrated as image 550'. The proportional of FIG. 5A and the proportional resize of FIG. 5B are examples of an application-defined manipulation.

Figure 6A:
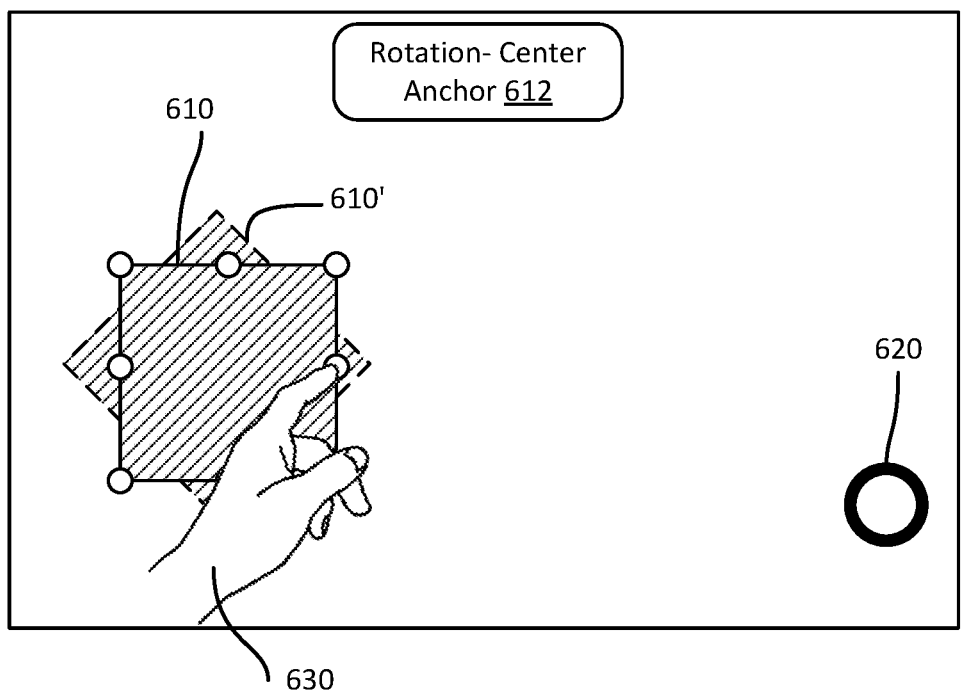
FIG. 6A and FIG. 6B illustrate examples of two different object manipulations based on a same side drag gesture, according to certain embodiments.
Figure 6B:
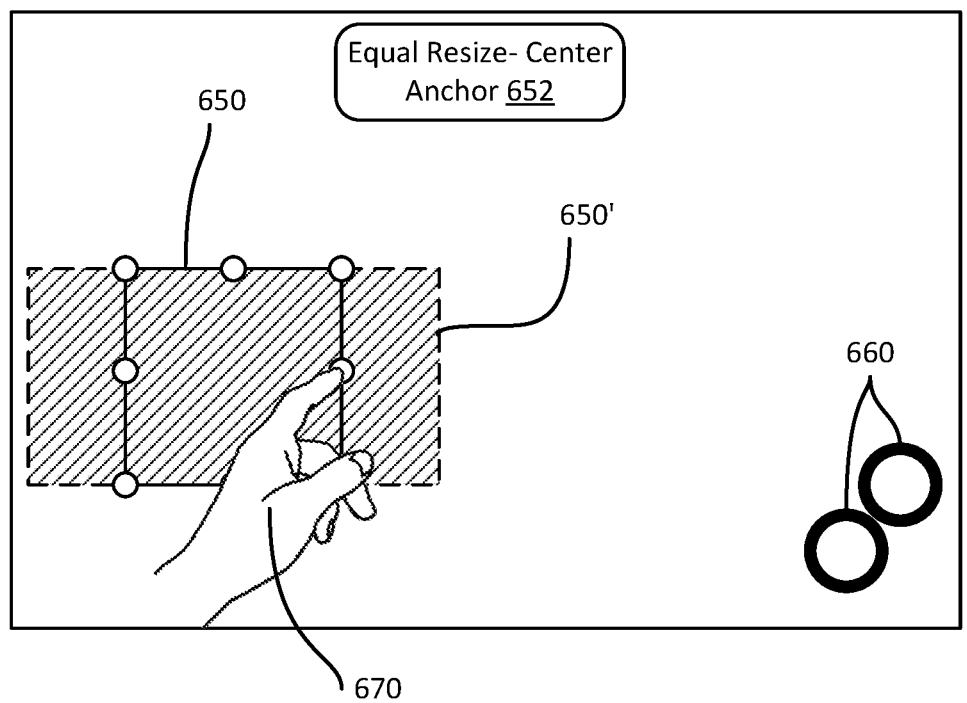

FIGS. 6A and 6B illustrate examples of two different object manipulations based on a same side drag gesture, according to certain embodiments. By using this user gesture, a side of a rendered object (e.g., a center point along the side) is tapped, held, and dragged in a certain direction. In a standard mode, the side drag results in a proportional resize of the object, in which the opposite side is anchored. The side drag and the proportional resize with the anchored opposite side are examples of a standard user gesture and a standard manipulation, respectively, that are commonly supported across different applications or different operating systems. A side drag gesture can be mapped to a standard manipulation model that includes a proportional resize manipulation.

In FIG. 6A, an image 610 is rendered at the GUI and is selected. A constrained mode is active, as shown with a UI element 620. A side drag gesture 630 is applied to the image 610. In the constrained mode, a mapping of user gestures to object manipulations indicates that the side drag gesture 630 is mapped to a rotation around a center of the image 610. Accordingly, the image 610 is rotated around its center, resulting in a rotated image 610'. The content application also updates a mode indicator 612 to describe that the object manipulation is a rotation anchored to a center of the image 610.

In FIG. 6B, an image 650 is rendered at the GUI and is selected. A constrained special mode is active, as shown with a UI element 660. A side drag gesture 670 is applied to the image 650. In the constrained special mode, a mapping of user gestures to object manipulations indicates that the side drag gesture 670 is mapped to an equal resize. In this resize, the tapped side and the opposite side are not anchored. The remaining sides and center of the image 650 are anchored such that the resize is performed by equally moving the tapped and opposite sides and expanding the image 650. The content application also updates a mode indicator 652 to describe that the object manipulation is an equal resize with an anchored center. The resized image is illustrated as image 650'. The rotation of FIG. 6A and the equal resize of FIG. 6B are examples of an application-defined manipulation.

Figure 7:
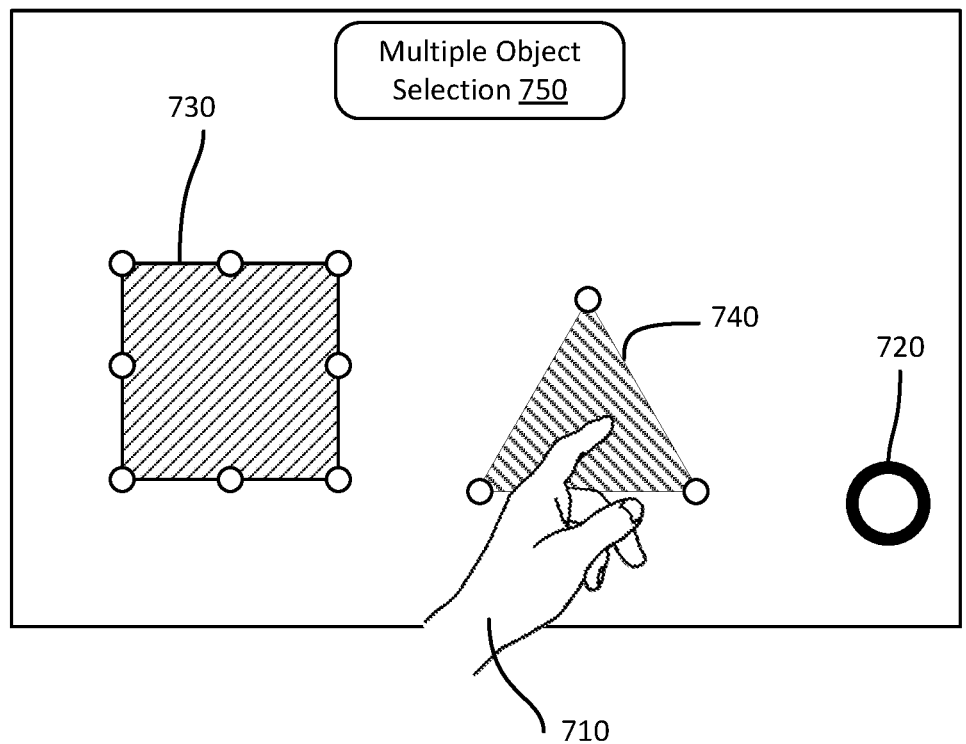
FIG. 7 illustrates an example of an object manipulation based on a tap gesture of an unselected object, according to certain embodiments.

FIG. 7 illustrates an example of an object manipulation based on a tap gesture 710 of an unselected object, according to certain embodiments. In the standard mode, the tap gesture 710 would deselect an already selected object and select the previously unselected object. The tap and the deselection are examples of a standard user gesture and a standard manipulation, respectively, that are commonly supported across different applications or different operating systems. A tap gesture can be mapped to a standard manipulation model that includes a deselection manipulation.

In FIG. 7, a constrained mode is active, as shown with a UI element 720. An image 730 is already selected. The tap gesture 710 is applied to another image 740. In the constrained mode, a mapping of user gestures to object manipulations indicates that a tap gesture over an unselected object is mapped to a selection of this object, while retaining the selection of an already selected object(s). Accordingly, the tap gesture 710 results in the multi-selection of the images 730 and 740. The content application also updates a mode indicator 750 to describe that the object manipulation is a multiple object selection. The object selection of FIG. 7 is an example of an application-defined manipulation.

In an example, no object manipulation is mapped to a tap gesture over an unselected object in a constrained special mode. In comparison, such mappings exist in the standard mode and in the constrained mode, as illustrated in FIG. 7. This example illustrates that no all user gestures need to be mapped in each of the manipulation modes. In other words, the size of the mappings can vary between the manipulation modes.

In another example, the mapping of a user gesture to an object manipulation can be the same across two or more manipulation modes. This example illustrates that some of the manipulations may share a common subset of the mappings such that user gesture can have a same result in different manipulation modes.

Additionally, FIGS. 3A through 7 illustrate examples of mappings, user gestures, object manipulations, and manipulation modes. Another number of manipulation modes can be used, where the number is greater than two. In each mode, a different mapping can be defined to support specific user gestures and to perform particular object manipulations. These object manipulations can edit any property of an object(s), whether the size, orientation, color, shape, shade, transparency, movement, animation, or other property that relates to how or where the object(s) should be rendered at a GUI.

Figure 8:
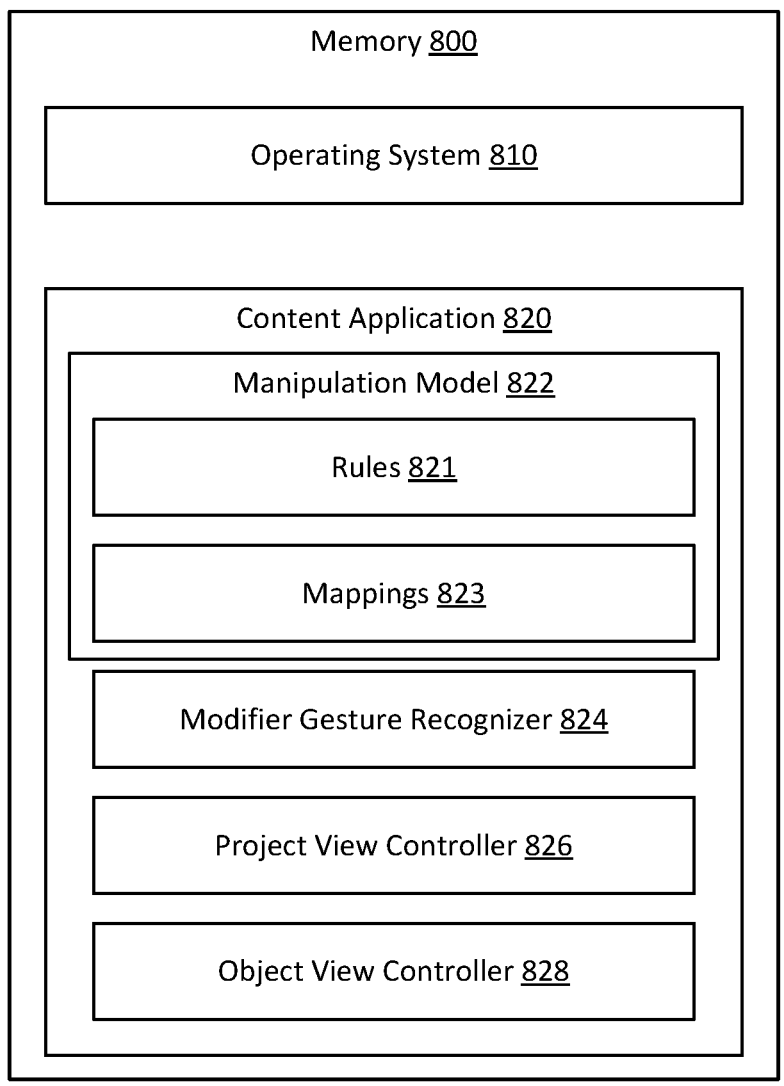
FIG. 8 illustrates examples of modules for manipulation an object in multiple manipulation modes, according to certain embodiments.

FIG. 8 illustrates examples of modules for manipulation an object in multiple manipulation modes, according to certain embodiments. Generally, a memory 800 of a computing device (or, likewise, a computer system) stores the modules. Each module represents code or data that can be executed or accessed by a processor of the computing device. The execution or access configure the computing device to perform specific operations that relate to a content application, such as the rendering and manipulation of an object(s). Each module in combination with the processor represent a means for performing a respective operation(s).

In an example, the memory 800 stores code (e.g., computer-readable instructions) for an operating system 810 and code for a content application 820. The operating system 810 is that of the computing device, such as an iOS from Apple, Incorporated or some other mobile operating system. The operating system 810 includes a gesture recognizer (e.g., a UIGestureRecognizer available in the iOS) that recognizes and sends touch screen data about a user gesture to the content application. In turn, the content application 820 renders and manipulates an object(s) at a touch screen GUI based on the received touch screen data.

Turning to the details of the content application 820, the content application 820 stores rules 821 and mappings 823. The rules 821 specify parametric conditions for selecting a manipulation mode from a plurality of manipulation modes supported by the content application 820. The mappings 823 identify which object manipulation should be applied given a user gesture and an active manipulation mode.

In an example, the mappings 823 include sets of mappings, such as tables, of user gestures to object manipulations, where each set (e.g., table) corresponds to a manipulation mode. In another example, the mappings 823 can also or alternatively include code (e.g., logic) for selecting and executing the applicable object manipulation given a user gesture and a manipulation mode.

In an example, a manipulation model 822 stores the rules 821 and the mappings 823. Hence, the manipulation model 822 enables a selection of a manipulation mode based on the rules 821. Further, standard user gestures are supported by the manipulation model 822. Depending on how the standard gestures are mapped to standard and application-defined manipulations in the mappings 823, the manipulation 822 thereby enables the application of standard manipulation or an application-defined manipulation in response to a standard user gesture in the different manipulation modes.

The content application 820 also includes a modifier gesture recognizer 824, a project view controller 826, and an object view controller 828, among other modules. The modifier gesture recognizer 824 enforces the rules 821 by selecting the relevant manipulation mode and sending information that this mode was selected and is active to the project view controller 826 and the object view controller 828. The modifier gesture recognizer 824 can also access the mappings 823 and identifies the applicable object manipulation and sends information about this manipulation to the project view controller 826 or the object view controller 828. The rules 821 or the mappings 823 can, but need not be stored, in the modifier gesture recognizer 824.

In an example, the modifier gesture recognizer 824 is implemented as a subclass of the gesture recognizer of the operating system 810. Upon a first user gesture associated with an activation of a manipulation mode, the respective touch screen data is received by the modifier gesture recognizer 824 from the operating system 810 and is analyzed relative to the rules 821 to select the manipulation mode. Once that mode is selected and upon a second user gesture associated with a manipulation of an object rendered at the GUI, the respective touch screen data is received by the modifier gesture recognizer 824 and is analyzed relative to the mapping corresponding to the selected mode to identify the applicable object manipulation. Generally, the modifier gesture recognizer 824 in combination with the processor represent a means for receiving a selection of a user to enter one of the supported manipulation modes and for receiving gesture input while one of the manipulation modes is selected.

The project view controller 826 manages a project available to a user based on the content application 820. The project can be a content file, a computing session, or some other set of electronic tasks that the content application 820 supports. In an example, the content application renders objects at the GUI as part of the project. The project view controller 826 manages the presentation of the project. For instance, the content application 820 receives the information about the selected manipulation mode and presents a corresponding mode indicator at the GUI. As described herein above, the mode indicator can include a popup (e.g., a text popup) that describes the selected manipulation mode and a UI element (e.g., a ring) that indicates that the selection. The popup is updatable to also describe the object manipulation. Generally, the project view controller 826 in combination with the processor represent a means for rendering the mode indicator.

The object view controller 828 manages how each object is rendered at the GUI of the content application 820. For instance, the object view controller 828 controls how and where an object is rendered and applies the order manipulation. In an example, the object view controller 828 receives the touch screen data and the information about the selected manipulation mode and accordingly determines the applicable object manipulation from the mappings. In another example, the object view controller 828 receives information about the applicable object manipulation directly from the modifier gesture recognizer 824. The object view controller 828 can also store the mappings 823 or the code for performing the different object manipulations. Generally, the object view controller 828 in combination with the processor represent a means for manipulating an object according to the object manipulation. If the manipulation corresponds to a standard object manipulation, the object view controller 828 in combination with the processor represent a means for executing the standard object manipulation. Otherwise, the object view controller 828 in combination with the processor represent means for executing an application-defined manipulation on an object.

Figure 9:
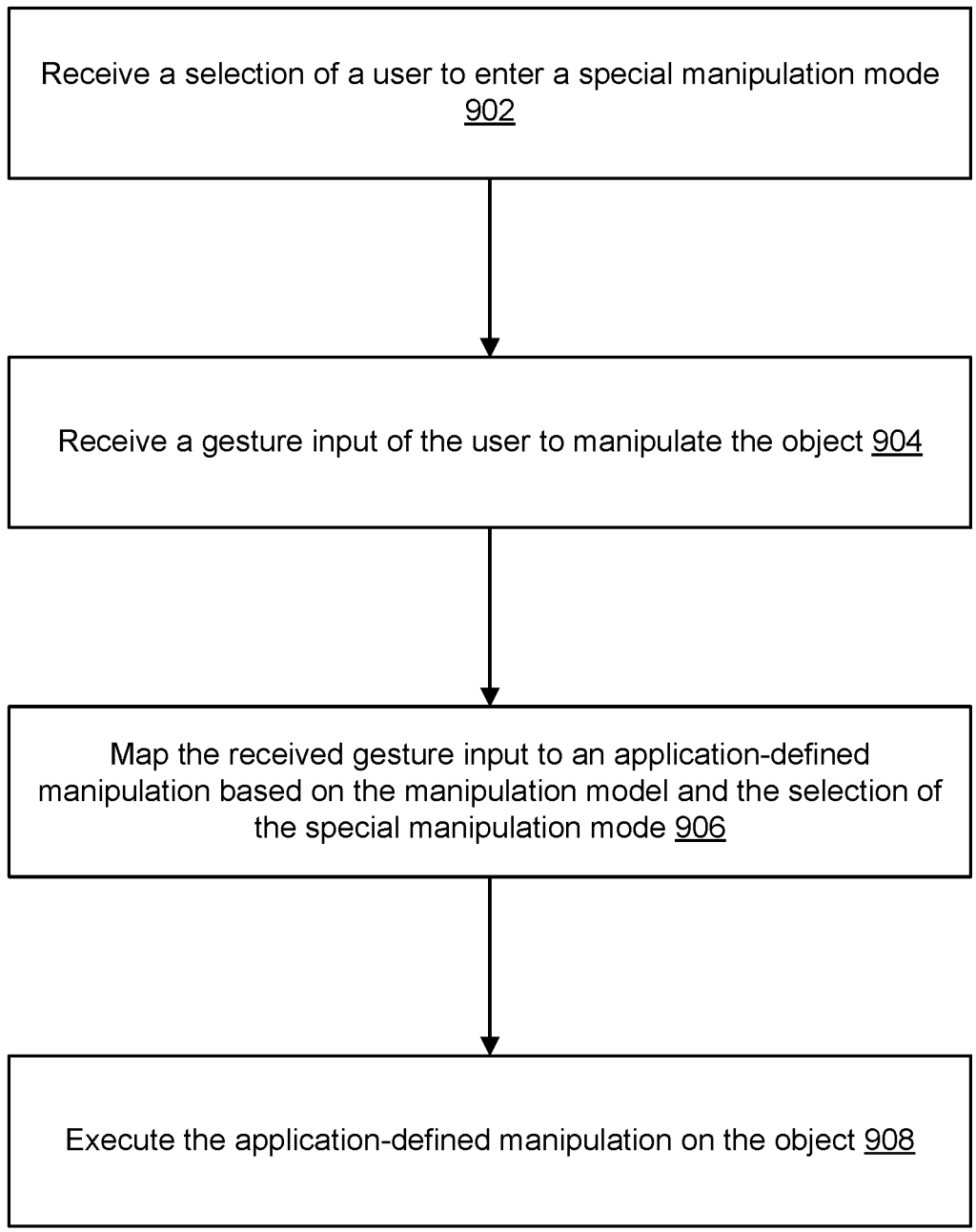
FIG. 9 illustrates a flow for manipulating an object in a manipulation mode from a plurality of manipulation modes supported by a content application, according to certain embodiments.

FIG. 9 is a diagram that illustrates a flow for manipulating an object in a manipulation mode from a plurality of manipulation modes supported by a content application, according to certain embodiments. The content application is illustrated as performing operations of the illustrative flow. In an example, the content application is hosted on a computing device that represents an end-user device that is portable and that has an operating system. In another example, the content application is hosted on a remote computing system that interfaces with the computing device. In this example, the GUI of the content application is presented at a touch screen of the computing device. While the operations are illustrated in a particular order, it should be understood that no particular order is necessary and that one or more operations may be omitted, skipped, and/or reordered The flow starts at operation 902, where the content application receives a selection of a user to enter a special manipulation mode. In an example, the content application supports multiple manipulation modes. One of these modes is a standard manipulation mode. At least one other mode is the special manipulation mode. A manipulation model associated with the application maps standard user gestures to standard object manipulations of the standard mode and to application-defined manipulations of each of the special manipulation modes. The application-defined manipulations are different from the standard manipulations and can be different from each other across the special manipulation modes. The selection corresponds to touch screen data. The touch screen data can be analyzed by a selection module of the content application, such as the modifier gesture recognizer 824 of FIG. 8, to select and enter (e.g., activate) the special manipulation mode. The analysis can involve a set of rules that specifies the selection given parametric conditions observed in the touch screen data.

At operation 904, the content application receives gesture input of the user to manipulate the object, while the special manipulation mode is activated. In an example, the gesture input is one of the standard user gestures that are supported by the content application. The gesture input corresponds to touch screen data associated with a user interaction with an object rendered by the content application at the GUI.

At operation 906, the content application maps the received gesture input to an application-defined manipulation based on the manipulation model and the selection of the special manipulation mode. In an example, the application-defined manipulation is different from a standard object manipulation defined by the manipulation mode for the same gesture input. The touch screen data associated with the gesture input can be analyzed by a mapping module of the content application, such as the modifier gesture recognizer 824 of FIG. 8, to identify application-defined manipulation. The analysis can involve a mapping available from the manipulation mode. The mapping specifies the selection of the application-defined manipulation given parametric conditions observed in the touch screen data and given the special manipulation mode.

At operation 908, the content application executes the application-defined manipulation on the object. In an example, the execution includes manipulating the object, such as editing its properties, and rendering the manipulated object at the GUI. The execution can be performed by an execution module of the content application, such as an object view controller 828, that receives information about the application-defined manipulation from the mapping module.

Figure 10:
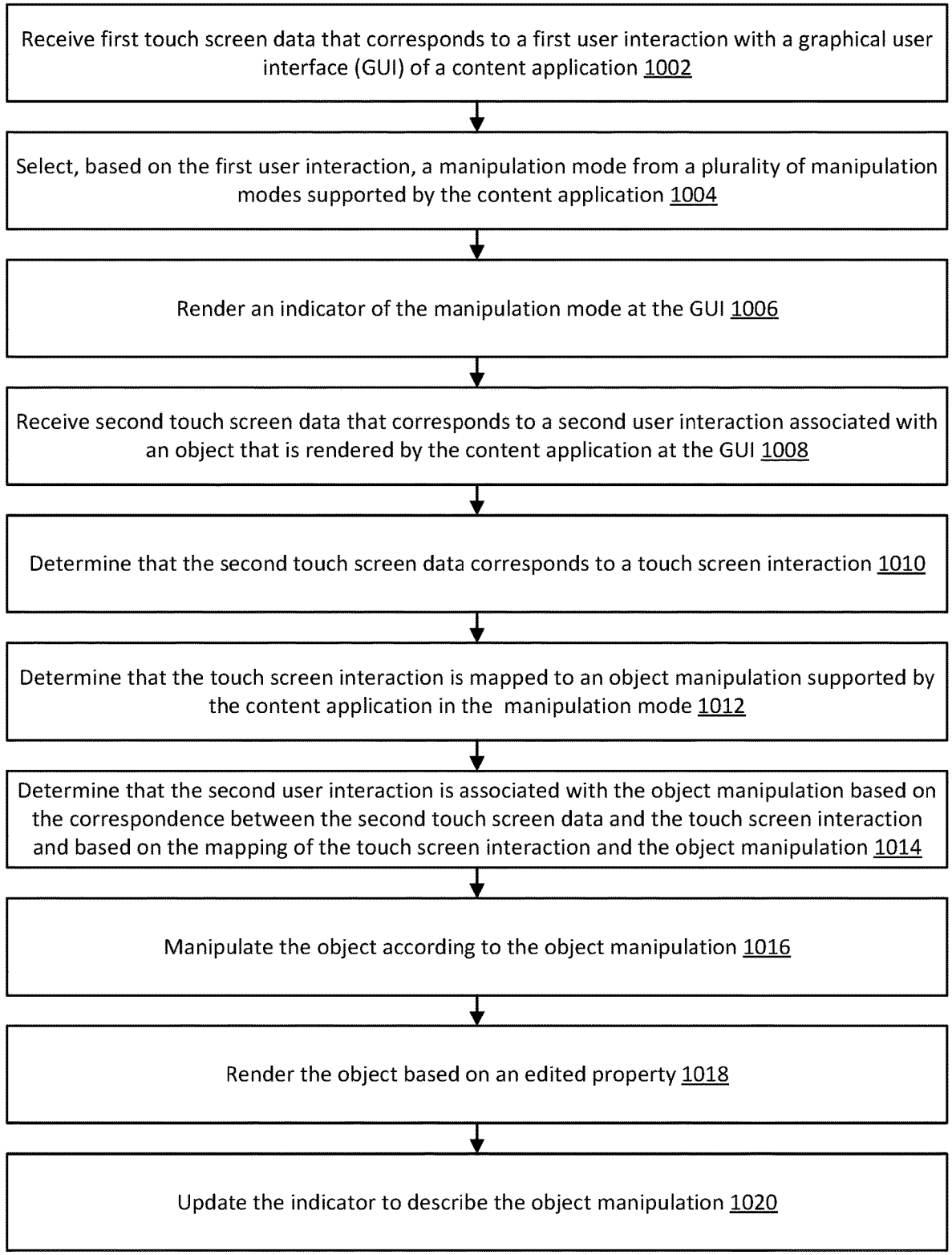
FIG. 10 illustrates a more detailed flow for manipulating an object in a manipulation mode from a plurality of manipulation modes supported by a content application, according to certain embodiments.

FIG. 10 is another diagram that illustrates a flow for manipulating an object in a manipulation mode from a plurality of manipulation modes supported by a content application, according to certain embodiments. The operations of the illustrative flow can be implemented as sub-operations of the illustrative flow of FIG. 9.

The flow starts at operation 1002, where the content application receives first touch screen data that corresponds to a first user interaction with a GUI of the content application. In an example, the first user interaction represents a user gesture at any location of the GUI. The touch screen data corresponds to that gesture and is received from the operating system of the computing device.

At operation 1004, the content application selects, based on the first user interaction, a manipulation mode (e.g., a first manipulation mode) from the plurality of manipulation modes is supported by the content application. Referring back to the example of a standard mode, constrained mode, and constrained special mode, the content application selects one of these manipulation modes based on the first touch screen data. In an example, the content application analyzes parameters of the first touch screen data relative to parametric conditions from a set of rules (e.g., an object already selected, number of touches, a time duration of a touch relative to a time threshold, and movement of the touch relative to a pixel threshold). The rules can specify a particular selection given how the parameters satisfy the parametric conditions.

Although a user gesture is illustrated at operations 1002 and 1004, other techniques are available to select the manipulation mode. For example, a dedicated button is available. The activation of this button results in the selection.

At operation 1006, the content application renders an indicator of the manipulation mode at the GUI. For example, a popup is rendered and describes the manipulation mode. In addition, a UI element is rendered at the location of the first user interaction on the GUI and indicates that the manipulation mode has been activated.

At operation 1008, the content application receives second touch screen data that corresponds to a second user interaction. This interaction is associated with an object (or, likewise, with a collection of objects) that is rendered at the GUI. The second interaction can be within, at the corners, at the edges, or outside of the object as illustrated in the previous figures. In an example, the second touch screen data is received from the operating system of the computing device.

At operation 1010, the content application determines that the second touch screen data corresponds to a user gesture. If the user gesture is supported by the content application in any of the manipulation modes, the remaining operations of the flow can be performed. Otherwise, the content application may not respond to the second user interaction or may display a message at the GUI indicating the lack of support.

At operation 1012, the content application determines that the user gesture is mapped to an object manipulation that is supported by the content application in the selected content manipulation mode. In an example, the content application accesses a mapping of user gestures to object manipulations available for the selected manipulation mode. If the user gesture is supported by in this mode, the remaining operations of the flow can be performed. Otherwise, the content application may not respond to the second user interaction or may display a message at the GUI indicating the lack of support.

At operation 1014, the content application determines that the second user interaction is associated with the object manipulation. In an example, this determination is based on the mapping and based on the manipulation mode being selected. For instance, the content application determines from the mapping that user gesture is mapped to the object manipulation in the selected manipulation mode.

At operation 1016, the content application manipulates the object according to the object manipulation. In an example, one or more properties of the object (or, likewise, of another object in the case of a multiple-object selection) are edited according to the object manipulation.

At operation 1018, the content application renders the object based on the edited property(ies). In an example, the look and feel or the location of the object as originally rendered is updated based on the property edit. This update is rendered at the GUI.

At operation 1020, the content application updates the indicator to describe the object manipulation. In an example, upon determining the object manipulation from the mapping, the content application updates the popup (or, likewise, renders another popup) that describes the object manipulation.

Figure 11:
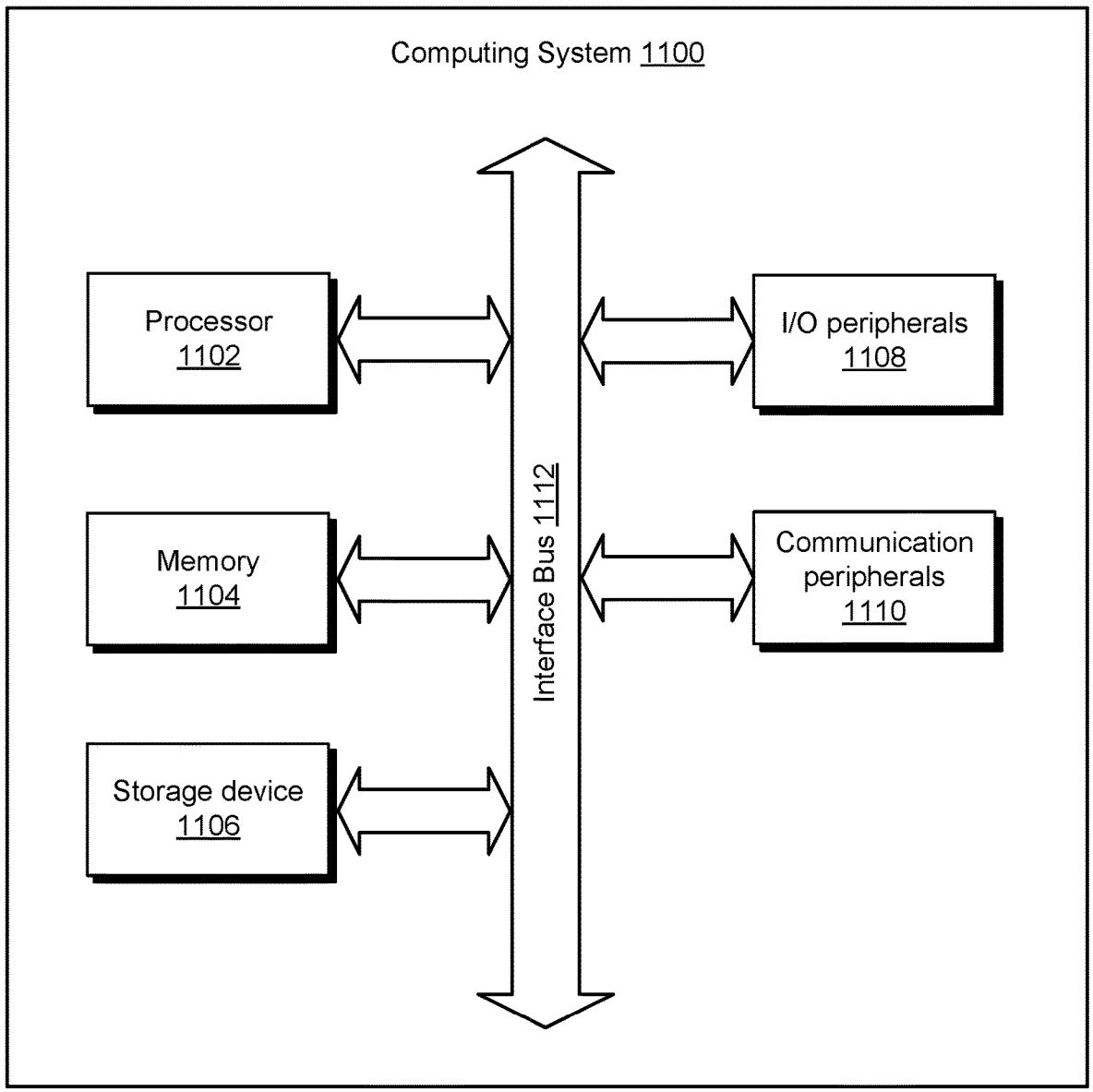
FIG. 11 illustrates examples of components of a computing system, according to certain embodiments.

FIG. 11 illustrates examples of components of a computing system 1100, according to certain embodiments. The computing system 1100 is an example of a computing device or a remote server that hosts the content application configured according to the functionalities described in connection with FIGS. 1-10. Although these components are illustrated as belonging to a same computing system 1100, the computing system 1100 can also be distributed.

The computing system 1100 includes at least a processor 1102, a memory 1104, a storage device 1106, input/output peripherals (I/O) 1108, communication peripherals 1110, and an interface bus 1112. The interface bus 1112 is configured to communicate, transmit, and transfer data, controls, and commands among the various components of the computing system 1100. The memory 1104 and the storage device 1106 include computer-readable storage media, such as RAM, ROM, electrically erasable programmable read-only memory (EEPROM), hard drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1104 and the storage device 1106 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 1100.

Further, the memory 1104 includes an operating system, programs, and applications (e.g., similarly to the memory 800 of FIG. 8 or data storage unit 111 of FIG. 1). The processor 1102 is configured to execute the stored instructions and includes, for example, a logical processing unit, a microprocessor, a digital signal processor, and other processors. The memory 1104 and/or the processor 1102 can be virtualized and can be hosted within another computing system of, for example, a cloud network or a data center. The I/O peripherals 1108 include user interfaces, such as a keyboard, screen (e.g., a touch screen), microphone, speaker, other input/output devices, and computing components, such as graphical processing units, serial ports, parallel ports, universal serial buses, and other input/output peripherals. The I/O peripherals 1108 are connected to the processor 1102 through any of the ports coupled to the interface bus 1112. The communication peripherals 1110 are configured to facilitate communication between the computing system 1100 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions, and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms, such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computing systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include logic for deciding, with or without author input or prompting, whether these features, elements, and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A method comprising:
receiving, by an application program executed by a computing device, a first user gesture input by a user to manipulate an object rendered by a graphical user interface (GUI) of the application program, the first user gesture being one of a set of user gestures;

determining that the application is operating in a first manipulation mode of a set of manipulation modes, the set of manipulation modes comprising the first manipulation mode, a second manipulation mode, and a third manipulation mode, wherein:
the first manipulation mode is associated with a first manipulation model that maps the set of user gestures to a first set of object manipulations across a plurality of applications executed by the computing device;
the second manipulation mode is associated with a second manipulation model that maps the set of user gestures to a second set of object manipulations specific to a first application, and
the third manipulation mode is associated with a third manipulation model that maps the set of user gestures to a third set of object manipulations specific to the first application;

in response to determining that the application program is operating in the first manipulation mode, and while in the first manipulation mode, mapping, using the first manipulation model, the received first user gesture to a first object manipulation;

manipulating the object according to the first object manipulation to generate a rendered modified object; and upon a ceasing of the first user gesture, receiving a second user gesture input by the user to exit the first manipulation mode, wherein:
if the second user gesture input occurs for a threshold duration without receipt of a third gesture user input by the user, entering the second manipulation mode and remaining in the second manipulation mode until an earlier of a ceasing of the second gesture input and a threshold amount of time, or
if the third user gesture input is received along with the second user gesture input at the graphical user interface during the threshold duration and the second user gesture input is ceased before the third user gesture input is ceased, entering the third manipulation mode and remaining in the third manipulation mode until an earlier of a ceasing of the third gesture input and the threshold amount of time; and if the second manipulation mode is entered, and while in the second manipulation mode:
receiving, by the application program, the first user gesture to manipulate the rendered modified object;
mapping the first user gesture to a second object manipulation as defined by the second manipulation model, the second object manipulation being different from the first object manipulation as defined by the first manipulation model for the same received first user gesture; and
executing the second object manipulation on the rendered modified object; or if the third manipulation mode is entered, and while in the third manipulation mode:
receiving, by the application program, the first user gesture to manipulate the rendered modified object;
mapping the first user gesture to a third object manipulation as defined by the third manipulation model, the third object manipulation being different from the first object manipulation as defined by the first manipulation model and the second object manipulation as defined by the second manipulation model for the same received first user gesture; and
executing the third object manipulation on the rendered modified object.

2. The method of claim 1, wherein executing the second object manipulation comprises:
editing a property of the rendered modified object based on an edit specified by the second object manipulation; and
modifying the rendered modified object based on the edited property.

3. The method of claim 1, wherein receiving the first user gesture input comprises receiving touch screen data corresponding to a user gesture.

4. The method of claim 3, wherein executing the second object manipulation comprises manipulating the rendered modified object by constraining touch screen data of the first user gesture.

5. The method of claim 1, further comprising:
rendering an indicator of the second manipulation mode while in the second manipulation mode.

6. The method of claim 5, wherein the indicator of the second manipulation mode comprises a graphic element rendered at a GUI location or a text element that is rendered at another GUI location and that describes the second manipulation mode.

7. The method of claim 6, further comprising:
updating the text element with a description of the second object manipulation in conjunction with the execution of the second object manipulation.

8. The method of claim 1, wherein the first user gesture comprises an interior drag of the rendered object, wherein the second object manipulation comprises at least one of: a vertical or horizontal movement of the rendered modified object based on the interior drag, or a duplication of the rendered modified object based on the interior drag.

9. The method of claim 1, wherein the first user gesture comprises a corner drag of the rendered object, wherein the second object manipulation comprises at least one of: a proportional resize that is anchored corner of the rendered modified object based on the corner drag, or a proportional resize that is anchored to a center of the rendered modified object based on the corner drag.

10. The method of claim 1, wherein the first user gesture comprises a side drag of the rendered object, wherein the second object manipulation comprises at least one of: a rotation of the rendered object around a center of the rendered modified object based on the side drag, or an equal resize of the rendered modified object around the center based on the side drag.

11. A computing system comprising:
one or more processors; and
a memory coupled with the one or more processors, the memory configured to store instructions that when executed by the one or more processors cause the one or more processors to:
receive, by an application program executed by a computing device, a first user gesture input by a user to manipulate an object rendered by a graphical user interface (GUI) of the application program, the first user gesture being one of a set of user gestures;
determine that the application program is operating in a first manipulation mode of a set of manipulation modes, the set of manipulation modes comprising the first manipulation mode, a second manipulation mode, and a third manipulation mode, wherein:

the first manipulation mode is associated with a first manipulation model that maps the set of user gestures to a first set of object manipulations across a plurality of applications executed by the first computing device;

the second manipulation mode is associated with a second manipulation model that maps the set of user gestures to a second set of object manipulations specific to a first application, and the third manipulation mode is associated with a third manipulation model that maps the set of user gestures to a third set of object manipulations specific to the first application;

in response to determining that the application is operating in the first manipulation mode, and while in the first manipulation mode, map, using the first manipulation model, the received first user gesture to a first object manipulation;

manipulate the object according to the first object manipulation to generate a rendered modified object; and upon a ceasing of the first user gesture, receive a second user gesture input by the user to exit the first manipulation mode, wherein:
  if the second user gesture input occurs for a threshold duration without receipt of a third gesture user input by the user, entering the second manipulation mode and remaining in the second manipulation mode until an earlier of a ceasing of the second gesture input and a threshold amount of time, or
  if the third user gesture input is received along with the second user gesture input at the graphical user interface during the threshold duration and the second user gesture input is ceased before the third user gesture input is ceased, entering the third manipulation mode and remaining in the third manipulation mode until an earlier of a ceasing of the third gesture input and the threshold amount of time; and if the second manipulation mode is entered, and while in the second manipulation mode:
  receive, by the application program, the first user gesture to manipulate the rendered modified object;
  map the first user gesture to a second object manipulation as defined by the second manipulation model, the second object manipulation being different from the first object manipulation as defined by the first manipulation model for the same received first user gesture; and
  execute the second object manipulation on the rendered modified object;

if the third manipulation mode is entered, and while in the third manipulation mode:
  receive, by the application program, the first user gesture to manipulate the rendered modified object,
  map the first user gesture to a third object manipulation as defined by the third manipulation model, the third object manipulation being different from both the first object manipulation as defined by the first manipulation model and the second object manipulation as defined by the second manipulation model for the same received first user gesture, and
  execute the third object manipulation on the rendered modified object.

12. The computing system of claim 11, wherein the first set of object manipulations and the second set of object manipulations comprise at least one same object manipulation and at least one different object manipulation.

13. The computing system of claim 11, wherein receiving the first user gesture input comprises receiving touch screen data corresponding to a user gesture.

14. The computing system of claim 13, wherein the instructions that when executed by the one or more processors further causes the one or more processors to render an indicator of the second manipulation mode, and wherein the indicator of the second manipulation mode is rendered based on information about the second manipulation mode being selected.

15. The computing system of claim 14, wherein the indicator of the second manipulation mode comprises a graphic element rendered at a GUI location or a text element that is rendered at another GUI location and that describes the second manipulation mode.

16. A non-transitory computer-readable storage medium storing instructions, executable by one or more processors, the instructions comprising:
  receiving, by an application program executed by a computing device, a first user gesture input by a user to manipulate an object rendered by a graphical user interface (GUI) of the application program, the first user gesture being one of a set of user gestures;
  determining that the application program is operating in a first manipulation mode of a set of manipulation modes, the set of manipulation modes comprising the first manipulation mode, a second manipulation mode, and a third manipulation mode, wherein:
    the first manipulation mode is associated with a first manipulation model that maps the set of user gestures to a first set of object manipulations across a plurality of applications executed by the computing device;
    the second manipulation mode is associated with a second manipulation model that maps the set of user gestures to a second set of object manipulations specific to a first application, and
    the third manipulation mode is associated with a third manipulation model that maps the set of user gestures to a third set of object manipulations specific to the first application;
  in response to determining that the application program is operating in the first manipulation mode, and while in the first manipulation mode, mapping, using the first manipulation model, the received first user gesture to a first object manipulation;
  manipulating the object according to the first object manipulation to generate a rendered modified object;
  upon ceasing of the first user gesture, receiving a second user gesture input by the user to exit the first manipulation mode, wherein:
    if the second user gesture input occurs for a threshold duration without receipt of a third gesture user input by the user, entering the second manipulation mode and remaining in the second manipulation mode until an earlier of a ceasing of the second gesture input and a threshold amount of time, or
    if the third user gesture input is received along with the second user gesture input at the graphical user interface during the threshold duration and the second user gesture input is ceased before the third user gesture input is ceased, entering the third manipulation mode and remaining in the third manipulation mode until an earlier of a ceasing of the third gesture input and the threshold amount of time; and
  if the second manipulation mode is entered, and while in the second manipulation mode:

receiving, by the application program, the first user gesture to manipulate the modified object;

mapping the first user gesture to a second object manipulation as defined by the second manipulation model, the second object manipulation being different from the first object manipulation as defined by the first manipulation model for the same received first user gesture; and executing the second object manipulation on the rendered modified object; or if the third manipulation mode is entered, and while in the third manipulation mode:

receiving, by the application program, the first user gesture to manipulate the rendered modified object, mapping the first user gesture to a third object manipulation as defined by the third manipulation model, the third object manipulation being different from both the first object manipulation as defined by the first manipulation model and the second object manipulation as defined by the second manipulation model for the same received first user gesture, and executing the third object manipulation on the rendered modified object.

17. The non-transitory computer-readable storage medium of claim 16, wherein the first user gesture comprises an interior drag of the rendered object, wherein the second object manipulation comprises at least one of: a vertical or horizontal movement of the rendered modified object based on the interior drag, or a duplication of the rendered modified object based on the interior drag.

18. The non-transitory computer-readable storage medium of claim 16, wherein the first user gesture comprises a corner drag of the rendered object, wherein the second object manipulation comprises at least one of: a proportional resize that is anchored corner of the rendered modified object based on the corner drag, or a proportional resize that is anchored to a center of the rendered modified object based on the corner drag.

19. The non-transitory computer-readable storage medium of claim 16, wherein the first user gesture comprises a side drag of the rendered object, wherein the second object manipulation comprises at least one of: a rotation of the rendered object around a center of the rendered modified object based on the side drag, or an equal resize of the rendered modified object around the center based on the side drag.

20. The non-transitory computer-readable storage medium of claim 16, wherein the first user gesture comprises a tap, and wherein the second object manipulation comprises a selection of multiple objects rendered at the GUI.

* * * * *